United States Patent
Cho et al.

(10) Patent No.: US 10,306,520 B2
(45) Date of Patent: May 28, 2019

(54) HANDOVER METHOD BETWEEN HETEROGENEOUS WIRELESS COMMUNICATION TECHNIQUES AND DEVICE FOR SAME

(71) Applicant: LG ELECTRONICS INC., Seoul (KR)

(72) Inventors: Heejeong Cho, Seoul (KR); Hyunsoo Ko, Seoul (KR); Hyeyoung Choi, Seoul (KR); Ilmu Byun, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 15/507,709

(22) PCT Filed: Oct. 16, 2014

(86) PCT No.: PCT/KR2014/009715
§ 371 (c)(1),
(2) Date: Feb. 28, 2017

(87) PCT Pub. No.: WO2016/043369
PCT Pub. Date: Mar. 24, 2016

(65) Prior Publication Data
US 2017/0295523 A1    Oct. 12, 2017

Related U.S. Application Data

(60) Provisional application No. 62/051,910, filed on Sep. 17, 2014.

(51) Int. Cl.
*H04W 36/00* (2009.01)
*H04W 76/10* (2018.01)
(Continued)

(52) U.S. Cl.
CPC ... *H04W 36/0055* (2013.01); *H04W 36/0016* (2013.01); *H04W 36/0033* (2013.01);
(Continued)

(58) Field of Classification Search
CPC ......... H04W 36/0055; H04W 36/0016; H04W 36/0077; H04W 36/0005; H04W 36/0083;
(Continued)

(56) References Cited

U.S. PATENT DOCUMENTS 8,369,854 B2 * 2/2013 Peisa ............... H04W 36/26
370/331
8,917,701 B2 * 12/2014 Takahashi ......... H04W 36/0083
370/231

(Continued)

FOREIGN PATENT DOCUMENTS

| KR | 1020090098638 | 9/2009 |
|----|---------------|--------|
| KR | 1020140099172 | 8/2014 |
| KR | 1020140106368 | 9/2014 |

OTHER PUBLICATIONS

PCT International Application No. PCT/KR2014/009715, International Search Report dated May 28, 2015, 2 pages.

*Primary Examiner* — Habte Mered
(74) *Attorney, Agent, or Firm* — Lee, Hong, Degerman, Kang & Waimey (57) ABSTRACT

The present invention relates to a handover method between heterogeneous wireless communication techniques and a device for same. A wireless access device is capable of: transmitting to a terminal condition information related to conditions required for the terminal to carry out a predetermined reporting action; establishing wireless connection with the terminal, when a request from the terminal due to the reporting action has been received; providing to a network controller of a core network a message according to the reporting action; receiving from the network controller
(Continued)

context information of the terminal for establishing security and data bearers; establishing a data bearer for each data flow to be handed over by using the context information, when a request for data transmission/reception according to the handover has been received from the terminal; and receiving data from the terminal.

10 Claims, 8 Drawing Sheets

(51) Int. Cl.
  *H04W 88/06* (2009.01)
  *H04W 36/14* (2009.01)
  *H04W 84/12* (2009.01)

(52) U.S. Cl.
  CPC ....... *H04W 36/0077* (2013.01); *H04W 76/10* (2018.02); *H04W 36/0005* (2013.01); *H04W 36/0083* (2013.01); *H04W 36/14* (2013.01); *H04W 84/12* (2013.01); *H04W 88/06* (2013.01)

(58) Field of Classification Search
  CPC ..... H04W 88/06; H04W 36/14; H04W 84/12; H04W 76/10
  See application file for complete search history.

(56) References Cited

U.S. PATENT DOCUMENTS

| | | | |
|---|---|---|---|
| 2008/0233963 A1 | 9/2008 | Alanara et al. | |
| 2013/0115949 A1* | 5/2013 | Centonza | H04W 36/245 |
| | | | 455/436 |
| 2014/0200016 A1 | 7/2014 | Siomina et al. | |
| 2017/0245318 A1* | 8/2017 | Rayavarapu | H04W 76/046 |

* cited by examiner

HANDOVER METHOD BETWEEN HETEROGENEOUS WIRELESS COMMUNICATION TECHNIQUES AND DEVICE FOR SAME

CROSS-REFERENCE TO RELATED APPLICATIONS

This application is the National Stage filing under 35 U.S.C. 371 of International Application No. PCT/KR2014/009715, filed on Oct. 16, 2014, which claims the benefit of U.S. Provisional Application No. 62/051,910, filed on Sep. 17, 2014, the contents of which are all hereby incorporated by reference herein in their entirety.

BACKGROUND OF THE INVENTION

Field of the Invention

The present invention relates to mobile communication, and more particularly, to a method and device for handover between heterogeneous wireless communication technologies in a communication environment that supports a plurality of wireless networks.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

Figure 1:
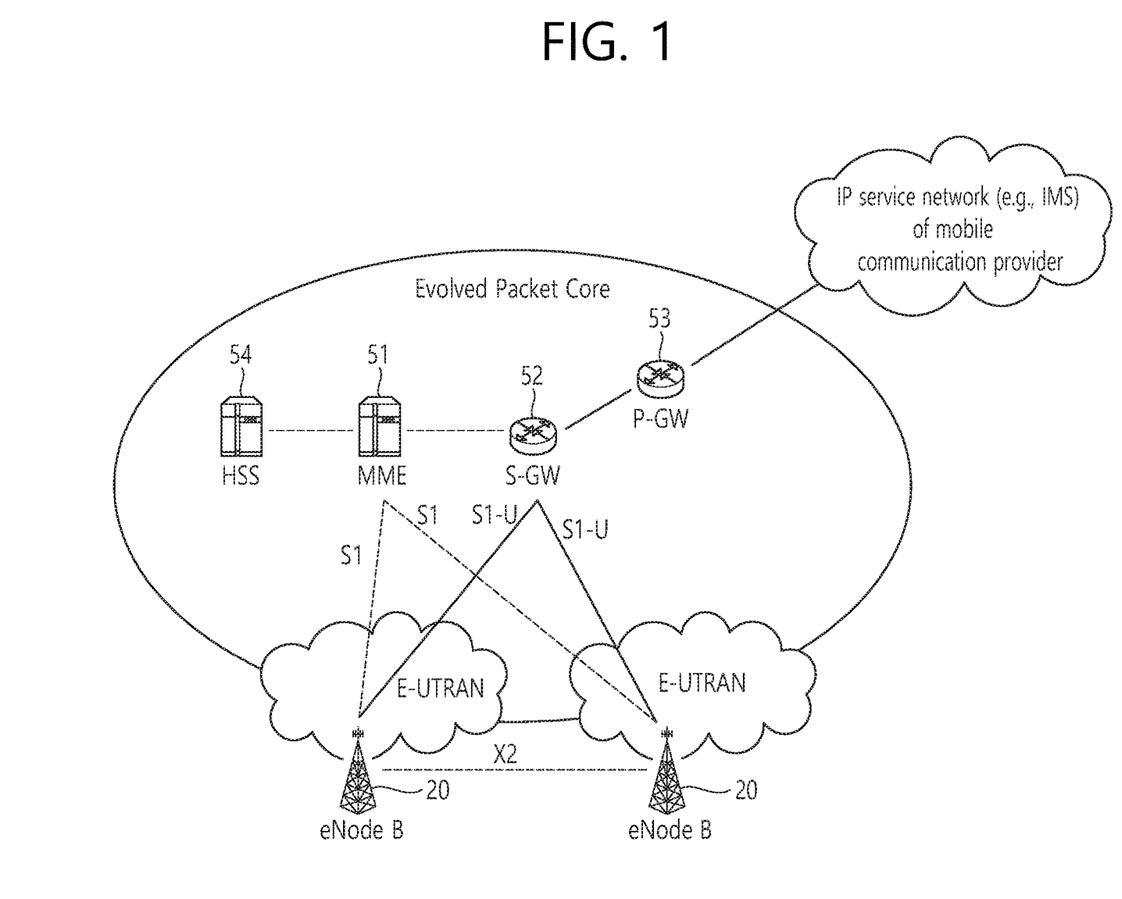
FIG. 1 is a schematic diagram illustrating a structure of an evolved mobile communication network.

FIG. 1 is a schematic diagram illustrating a structure of evolved mobile communication network.

As shown in FIG. 1, an evolved UMTS terrestrial radio access network (E-UTRAN) is connected to an evolved packet core (EPC).

The E-UTRAN includes base stations (or eNodeBs) 20 that provides a control plane and a user plane to a user equipment (UE). The base stations (or eNodeBs) 20 may be interconnected through an X2 interface.

The radio interface protocol layers between the UE and the base station (or eNodeB) 20 may be divided by L1 (a first layer), L2 (a second layer) and L3 (a third layer) based on lower three layers of open system interconnection (OSI) standard model that is widely known in communication systems. Among these layers, a physical layer included in the first layer provides an information transfer service using a physical channel, and a radio resource control (RRC) layer located at the third layer performs a role of controlling radio resources between the UE and the base station. For this, the RRC layer exchanges a RRC message between the UE and the base station.

Meanwhile, the EPC may include various elements. FIG. 1 shows a mobility management entity (MME) 51, a serving gateway (S-GW) 52, a packet data network gateway (PDN GW) 53 and a home subscriber server (HSS) 54 among the various elements.

The base station (or eNodeB) 20 is connected to the mobility management entity (MME) 51 of the EPC through an S1 interface, and is connected to the serving gateway (S-GW) 52 through an S1-U.

The S-GW 52 is an element that operates at a boundary point between a radio access network (RAN) and a core network and has a function of maintaining a data path between an eNodeB 20 and the PDN GW 53. Furthermore, if a user equipment (UE) moves in a region in which service is provided by the eNodeB 20, the S-GW 52 plays a role of a local mobility anchor point. That is, for mobility within an E-UTRAN (universal mobile telecommunications system (Evolved-UMTS) terrestrial radio access network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or global system for mobile communication (GSM) (GERAN)/enhanced data rates for global evolution (EDGE) radio access network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an interworking wireless local area network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

Meanwhile, recently, the high speed data traffic has been rapidly increased. In order to meet such traffic increase, technologies have been introduced for offloading the traffic of UE to WLAN (Wi-Fi) or a small cell.

Figure 2:
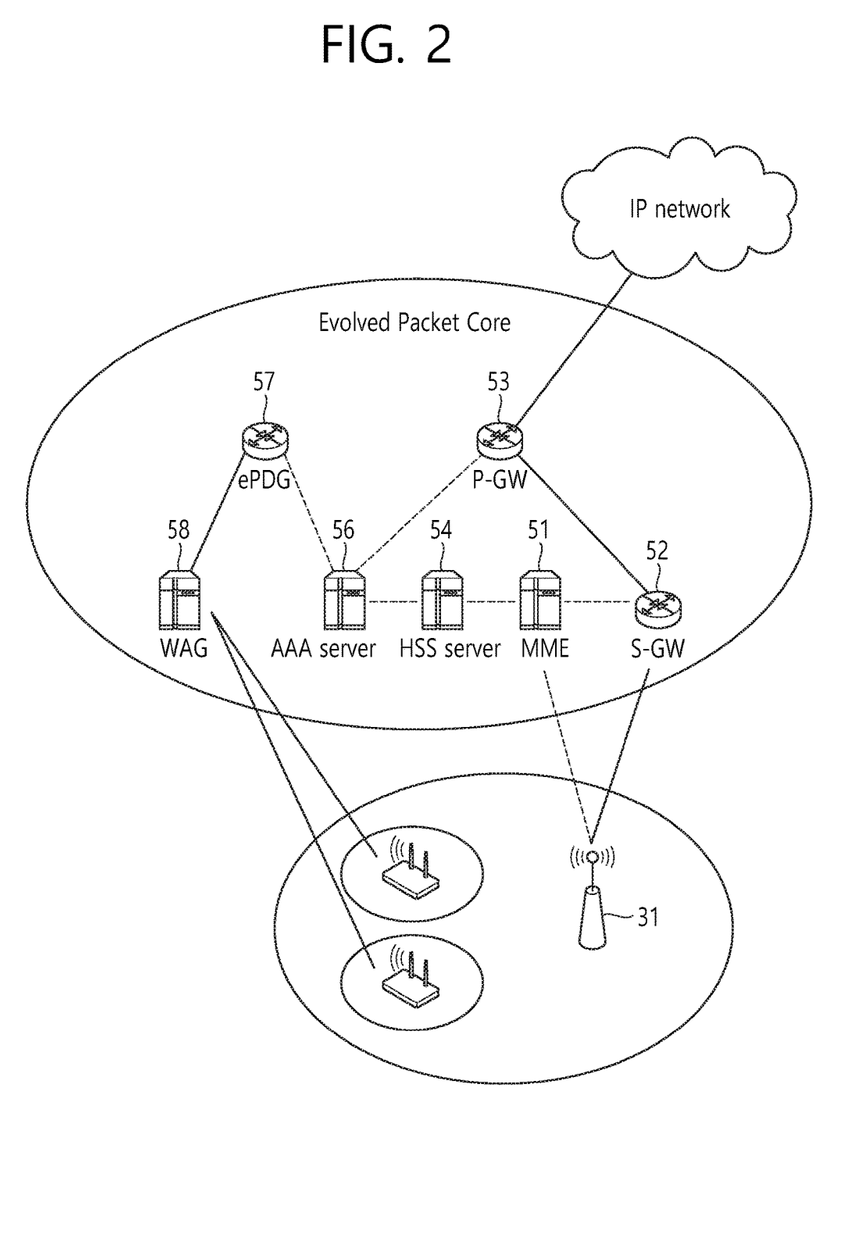
FIG. 2 is a schematic diagram illustrating a network structure in which a small scale cell and a WLAN AP are added.

FIG. 2 is a schematic diagram illustrating a network structure to which a small cell or a WLAN AP is added.

Referring to FIG. 2, within the coverage of a base station 31 for the small cell, a plurality of WLAN AP may be arranged. That is, several radio access technologies (RATs) are existed around a UE. Accordingly, the UE may distribute data traffic into the several RATs. The base station 31 for small cell may be arranged within the coverage of a macro base station such as the existing eNodeB.

As known from by reference to FIG. 2, the P-GW 53 and the HSS 54 are connected to an access authentication authorization (AAA) server 56. The P-GW 53 and the AAA server 56 may be connected to an evolved packet data gateway (ePDG) 57. The ePDG 57 plays a role of a security node for not being trusted non-3GPP network (e.g., WLAN or Wi-Fi, etc.). The ePDG 57 may be connected to a WLAN access gateway (WAG) 58. The WAG 58 may be in charge of a role of P-GW in Wi-Fi system.

In this way, when an existing mobile communication network and a heterogeneous network are coupled, handover between heterogeneous networks may be performed.

Figure 3:
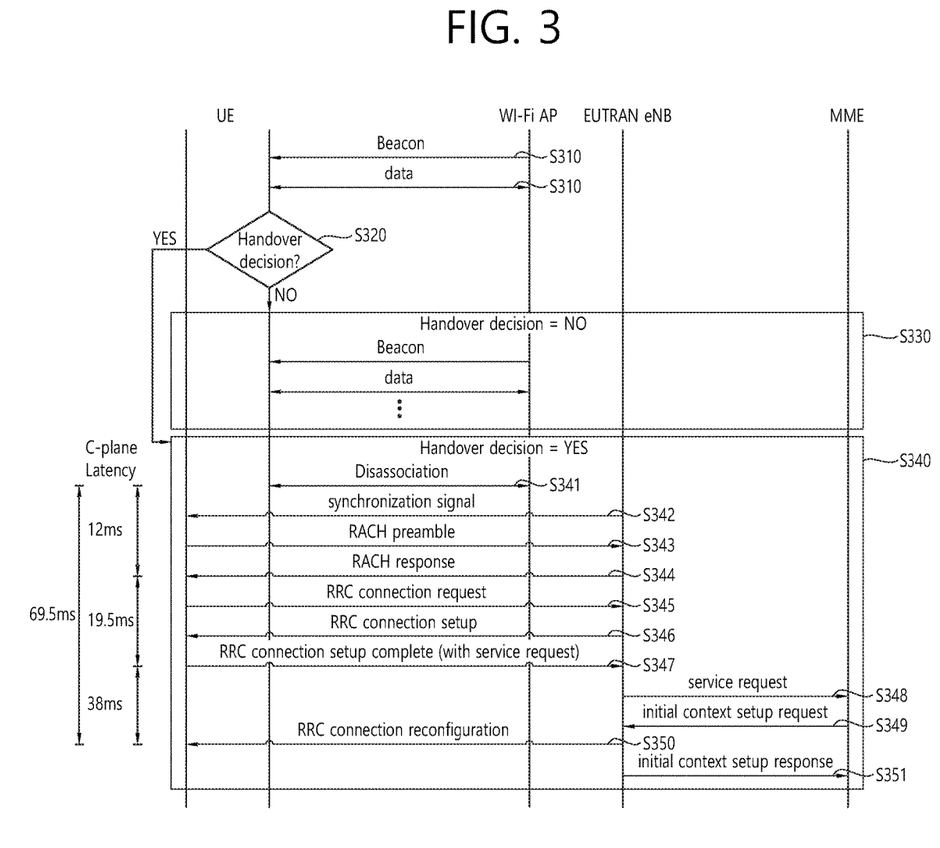
FIG. 3 is a control flowchart illustrating time delay of a control plane upon performing handover between heterogeneous networks.

FIG. 3 is a control flowchart illustrating time delay in a control plane upon performing handover between heterogeneous networks.

As shown in FIG. 3, transmission and reception of beacon and data between an UE and an AP (WiFi AP) is performed using a wireless LAN (WiFi). That is, the UE performs wireless communication through the wireless LAN (S310).

The UE may determine handover to another wireless communication network when intensity of a transmitted and received signal becomes weak or according to a load of a transmitted and received signal (S320).

Because intensity of a signal is not changed and because there is no large change in a load of a transmitted and received signal, when communication can be continued through the wireless LAN, it is determined that the UE does not perform handover and the UE maintains communication with the WiFi AP (S330).

However, when it is impossible to maintain communication through the wireless LAN with weakening of intensity of a signal or with increase in a load of a transmitted and received signal, the UE may determine handover to another wireless communication network (S340).

When handover is determined, connection between the UE and the WiFi AP is disassociated (S341), and the UE attempts connection to a base station, for example a EUTRAN eNB for connection to a heterogeneous communication network.

When the UE receives a synchronization signal from the EUTRAN eNB and is synchronized with the EUTRAN eNB (S342), the UE transmits a random access channel (RACH) preamble to the EUTRAN eNB (S343), and the EUTRAN eNB transmits a RACH response to the UE (S344).

When random access is established, the UE requests Radio Resource Control (RRC) connection to the EUTRAN eNB (S345), and the EUTRAN eNB transmits an RRC connection setup to the UE in response thereto (S346).

The UE transmits an RRC connection setup complete message including a service request to a core network to the EUTRAN eNB (S347). Thereby, wireless network connection is established between the UE and the EUTRAN eNB, and the UE and the EUTRAN eNB maintain an RRC connection state.

As shown in FIG. 3, about 12 ms is consumed in transmission and reception of an RACH signal, and about 19.5 ms is consumed in wireless connection between the UE and the EUTRAN eNB.

The EUTRAN eNB, having received a service request from the UE transmits a service request message to the MME (S348).

When the service request is received, the MME may determine whether the UE, having requested the service is an authenticated UE and transmit an initial context setup request message including an MME UE S1AP ID, an eNBUE S1AP ID, an UE Aggregate Maximum Bit Rate, an E-RAB ID, a QoS parameter, an S-GW address, an S1 S-GW TEID, and a Security Key to the EUTRAN eNB (S349).

The EUTRAN eNB, having received the initial context setup request message sets data bearer based on context information within the corresponding message and transmits an RRC connection reconfiguration message including setup information of data bearer to the UE (S350).

When data bearer setup is complete, the EUTRAN eNB transmits an initial context setup response to the initial context setup request message to the MME (S351). Such a Non Access Stratum (NAS) message between the MME and the UE is transmitted and received through backhaul, and about 38 ms is consumed in transmission and reception of the NAS message after wireless connection is performed between the UE and the EUTRAN eNB.

In this way, upon performing handover between heterogeneous networks, time delay consumed in a control plane is about 69.5 ms. When it is assumed that communication between the UE and the EUTRAN eNB and between the EUTRAN eNB and the MME is smoothly performed and that there is no failure in transmission and reception of an RACH signal for RRC connection, such time delay may occur and be regarded as a minimum time consumed in a control plane upon performing handover.

Further, when dataflow corresponding to data bearer generated through initial context setup do not correspond with data flow in which the UE is to hand over from Wi-Fi to a cellular network, the UE should request data bearer setup of data flow to hand over to the cellular network through a public data network (PDN) connection request message to the MME. When such a procedure is performed, a time consumed in a control plane additionally increases upon performing handover between heterogeneous networks.

When a processing time between the UE and the MME and a NAS message transmission and reception time may be simplified upon performing handover, i.e., when a process of steps S348 to S351 may be shortened, time delay to be required upon performing handover will be able to also reduce.

Figure 4:
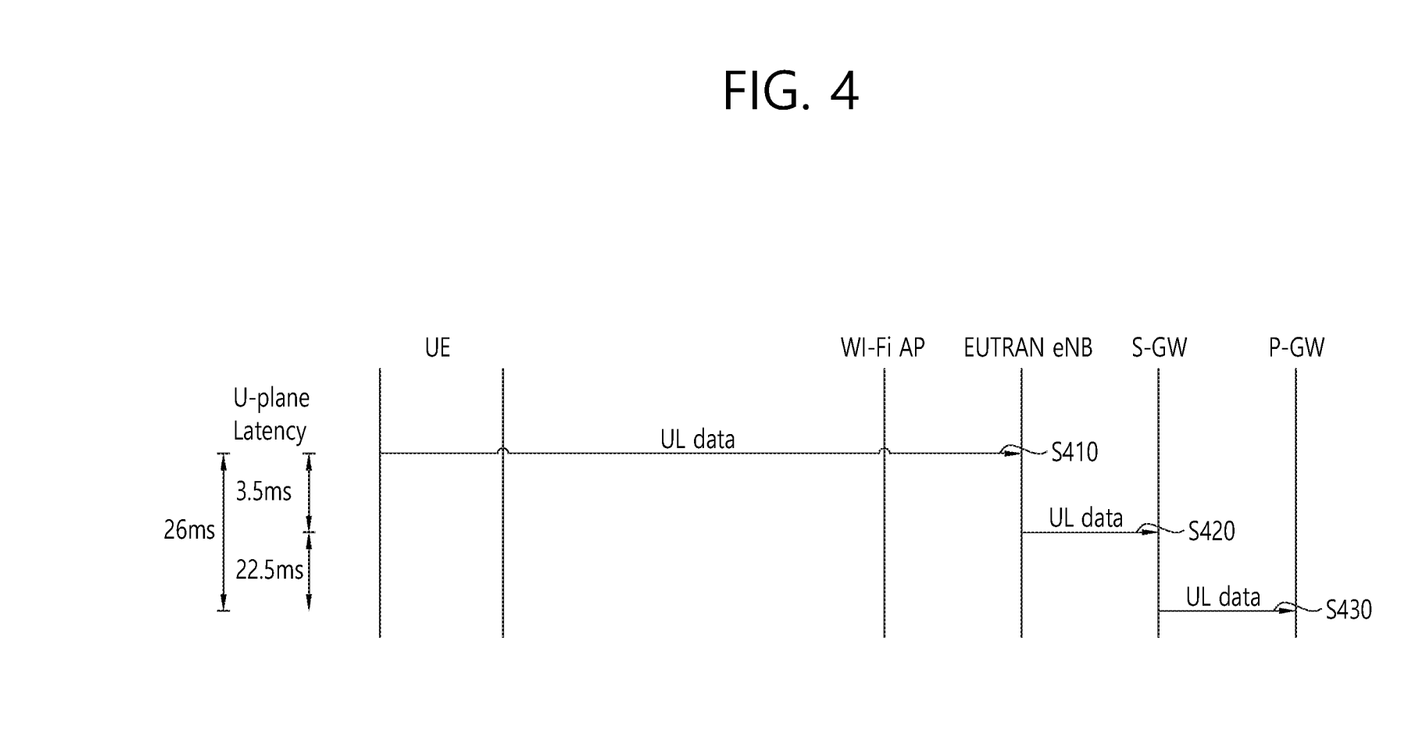
FIG. 4 is a control flowchart illustrating time delay of a user plane upon performing handover between heterogeneous networks.

FIG. 4 is a control flowchart illustrating time delay of a user plane upon performing handover between heterogeneous networks.

When data bearer is set, the UE may transmit UL data to the EUTRAN eNB (S410), and the EUTRAN eNB transmits the UL data to an S-GW and a P-GW (S420 and S430).

When there is no scheduling delay, as shown in FIG. 4, upon performing handover between heterogeneous networks, time delay consumed in a user plane is about 26 ms.

In short, when the UE performs handover to LTE, which is a heterogeneous network while performing communication through the wireless LAN, a time consumed in a control plane for network connection is 69.5 ms, and a time consumed in a user plane for data uplink is 26 ms, and total time delay is about 95.5 ms.

Table 1 represents quality control information (QCI) required per service.

TABLE 1

| QCI | Resource Type | Priority | Packet Delay Budget (NOTE 1) | Packet Error Loss Rate (NOTE 2) | Example Services |
|---|---|---|---|---|---|
| 1 (NOTE 3) | GBR | 2 | 100 ms | $10^{-2}$ | Conversational Voice |
| 2 (NOTE 3) | | 4 | 150 ms | $10^{-3}$ | Conversational Video (Live Streaming) |
| 3 (NOTE 3) | | 3 | 50 ms | $10^{-3}$ | Real Time Gaming |
| 4 (NOTE 3) | | 5 | 300 ms | $10^{-6}$ | Non-Conversational Video (Buffered Streaming) |
| 5 (NOTE 3) | Non-GBR | 1 | 100 ms | $10^{-6}$ | IMS Signalling |
| 6 (NOTE 4) | | 6 | 300 ms | $10^{-6}$ | Video (Buffered Streaming) TCP-based (e.g. www, e-mail, chat, ftp, p2p file sharing, progressive video, etc.) |
| 7 (NOTE 3) | | 7 | 100 ms | $10^{-3}$ | Voice, Video (Live Streaming) Interactive Gaming |
| 8 (NOTE 5) | | 8 | 300 ms | $10^{-6}$ | Video (Buffered Streaming) TCP-based (e.g , www, e-mail, chat, ftp, p2p file sharing, progressive video, etc.) |
| 9 (NOTE 6) | | 9 | | | |

As shown in Table 1, because packet delay of QCI 3 is 50 ms, when following time delay occurring in current handover, packet delay requirements of QCI 3 may not be satisfied.

Further, in a case of QCI 1, 5, and 7 in which packet delay is 100 ms, packet delay requirements may not be satisfied according to a load of a wireless network or a core network and additional PDN connection request execution.

Further, a new service such as realistic communication technology and tactile Internet requiring packet delay of about 1 ms, and remote medical or remote control requiring packet delay of about 40 m requires packet delay smaller than that of an existing service.

Therefore, as described above, upon performing handover between heterogeneous networks, shortening of a delay time is required.

SUMMARY OF THE INVENTION

The present invention provides a method and device for reducing packet delay upon performing handover.

The present invention further provides a method and device for previously setting a context of at least one data flow to perform handover between network controllers between a terminal and a core network.

The present invention further provides a method and device for reporting signal intensity when performing wireless communication through a wireless LAN and previously setting a context of at least one data flow to thus perform handover.

In an aspect, a handover method includes: transmitting information about a condition in which a terminal performs a predetermined reporting action to the terminal; establishing, when a request by the reporting action is received from the terminal, wireless connection to the terminal and providing a message according to the reporting action to a network controller of a core network; receiving context information of the terminal for setting security and data bearer from the network controller; setting, when a request for data transmission and reception according to handover is received from the terminal, data bearer of each data flow to perform handover using the context information; and receiving data received from the terminal Advantageous Effects According to the present invention, upon performing handover, packet delay can be reduced.

According to the present invention, a method and device for previously setting a context of at least one data flow to perform handover between network controllers between a terminal and a core network are provided.

Further, the present invention provides a method and device for reporting signal intensity when performing wireless communication through a wireless LAN and previously setting a context of at least one data flow to thus perform handover.

DESCRIPTION OF EXEMPLARY EMBODIMENTS

A wireless device may be fixed or may have mobility and may be referred to as different terms such as a User Equipment (UE), a mobile station (MS), a user terminal (UT), a subscriber station (SS), and a mobile terminal (MT). Further, the terminal may be a device that can carry having a communication function, such as a mobile phone, a personal digital assistant (PDA), a smart phone, a wireless modem, and a notebook computer or may be a device that cannot carry, such as a personal computer (PC) and a vehicle mounting device. A base station indicates a fixed station that generally communicates with a wireless device and may be referred to as different terms such as an evolved-NodeB (eNB), a Base Transceiver System (BTS), and an access point.

Hereinafter, it will be described that the present invention is applied based on 3rd Generation Partnership Project (3GPP) long term evolution (LTE) or 3GPP LTE-Advanced (LTE-A). This is only an illustration and the present invention may be applied to various wireless communication systems. Hereinafter, LTE may include LTE and/or LTE-A.

This specification describes a communication network as an object, and a work that performs in a communication network may be performed in a process in which a system (e.g., a base station) that controls the communication network controls a network and transmits data or a work may be performed in a terminal linked to the network.

Different wireless networks may include currently known entire communication networks, and hereinafter, in the present invention, it will be exemplified that handover occurs from wireless communication using a wireless LAN to a cellular network such as an LTE communication network.

According to the present invention, in order to reduce a handover processing time and time delay according to NAS message transmission and reception, the terminal may monitor reduction of signal intensity according to a current wireless communication network and perform context pre-setup for generating data bearer before handover according to monitored signal intensity.

According to an exemplary embodiment of the present invention, for context pre-setup, a wireless access device such as the base station may control the terminal to report a wireless LAN state.

The base station enables the terminal to report a communication state of a wireless LAN, i.e., a change of a wireless communication environment to the base station. That is, the base station may determine an environment condition in which the terminal may perform a specific operation.

An action type in which the terminal should perform is that the terminal reports a state of a wireless LAN to a cellular network system, i.e., the base station (report to cellular systems), and the base station may notify the terminal of an action threshold, which is a condition for performing such an action.

An action threshold may represent a threshold value of a beacon Received Signal Strength Indicator (RSSI) used as a condition for performing a predetermined reporting action. Such an action threshold enables a cellular network system to previously determine wireless LAN wireless signal attenuation of the terminal and may be set to a value larger than a handover trigger threshold.

When another wireless LAN access device for handover, i.e., another AP (APs to be re-associated) that can be connected to the terminal is not found at a periphery of the terminal, such a reporting action of the terminal may be performed.

Further, the base station should notify the terminal of information about a time condition that should satisfy before a reporting action is performed, i.e., T_duration meaning a time in which intensity of a signal according to a wireless LAN should represent an action threshold or less. That is, the terminal may monitor whether a signal lower than an action threshold is detected for a duration and perform a reporting action, if intensity of a receiving signal satisfies an action threshold for a duration or more.

In short, the base station should determine condition information about environment setup, such as an action type, an action threshold, and a duration and notify the terminal of the condition information. Such environment setup condition information may be changed or reset, and when the environment setup condition information is changed, the environment setup condition information should be transmitted from the base station to the terminal.

Condition information about the determined environment setup may be transmitted to the terminal using a message defined to an existing cellular system, such as an RRC connection reconfiguration message or an RRC connection release message.

Alternatively, condition information about environment setup may be transmitted to the terminal using a newly defined message.

Alternatively, according to another exemplary embodiment of the present invention, such condition information may be pre-setup and pre-defined between the terminal and the base station. In this case, condition information may not be signaled from the base station to the terminal.

Alternatively, according to another exemplary embodiment of the present invention, such condition information may be previously set by the terminal.

A terminal having condition information about environment setup of a wireless LAN state among terminals registered at a cellular communication system, but in an idle state and that perform data transmission and reception through a wireless LAN may perform a reporting action according to condition information. Further, only when a characteristic of data transmitted and received through the wireless LAN corresponds to a service sensitive to delay (e.g., realtime gaming, video live streaming), a corresponding reporting action may be performed.

When a condition according to a predetermined reporting action, i.e., when it satisfies a duration that intensity of a signal is an action threshold or less, the terminal may start a procedure notifying a cellular system that a condition for environment setup has been satisfied.

The terminal may change a duration according to a speed of the terminal, and in this case, a condition to be trigger of a reporting action for a changed duration should be satisfied. The changed duration may be represented with Equation 1.

$$\text{changed duration} = T\_duration \times \alpha \qquad <\text{Equation 1}>$$

In Equation 1, T_duration represents a duration before change, and $\alpha$ is a value set according to a speed of the terminal, for example may be set to a large value when a speed of the terminal is high and may be set to a small value when a speed of the terminal is low.

$\alpha$ may be determined by the terminal or may be transmitted with an RRC message by the base station. The base station may provide $\alpha$ of a speed of the terminal as a lookup table to the terminal.

As described above, when another wireless LAN access device for handover, i.e., other APs (APs to be re-associated) that may be connected to the terminal is not founded at a periphery of the terminal, such a reporting action of the terminal may be performed.

When another AP to connect is not founded at a periphery, if a received beacon RSSI is smaller than an action threshold, the terminal may report the received beacon RSSI to the base station or the MME, which is a cellular network node.

When intensity attenuation of a signal according to wireless LAN communication is detected, the terminal may report the intensity attenuation to the MME using a Non Access Stratum (NAS) protocol. The terminal may perform a reporting action using a Tracking Area Updating (TAU) procedure of an NAS message.

The terminal may be triggered and perform TAU when a received Tracking Area code (TAC) is different from a TAC in which the terminal currently has or at every TAU cycle, as in an existing case.

Alternatively, in a WLAN connection configuration, when an event that can perform a reporting action occurs in an environment change of a wireless LAN such as signal intensity attenuation, the terminal may perform TAU.

Alternatively, in a state in which a reporting action condition of such an event is satisfied, when a context valid duration is terminated or when a serving cell of the terminal is changed, the terminal may perform TAU.

When the terminal performs TAU, information that should be added for a reporting action is information (Event type) about an event type and an Estimated Hand Over time.

When a type 1 of an event type is set that "signal intensity by a wireless LAN becomes worse than an action threshold, the terminal may include "type 1" in a TAU message to transmit the TAU message to the base station.

An estimated handover time represents an estimated gap from a time point in which an event has occurred to an estimated time point in which handover is performed.

When the terminal reports such an event, the base station and the MME may recognize attenuation of signal intensity of the wireless LAN, and a cellular network may determine a serving cell, which is a location of the terminal in an idle state.

According to another exemplary embodiment of the present invention, the terminal may report a signal state of a wireless LAN to the base station and the MME through an RRC message instead of an NAS message. In this case, the terminal should transmit information about an identifier of the terminal and an MME identifier for identifying the MME in a registered state at the terminal to the base station. That is, the base station may transmit a reporting message of the terminal to the MME specified by the MME identifier.

Figure 5:
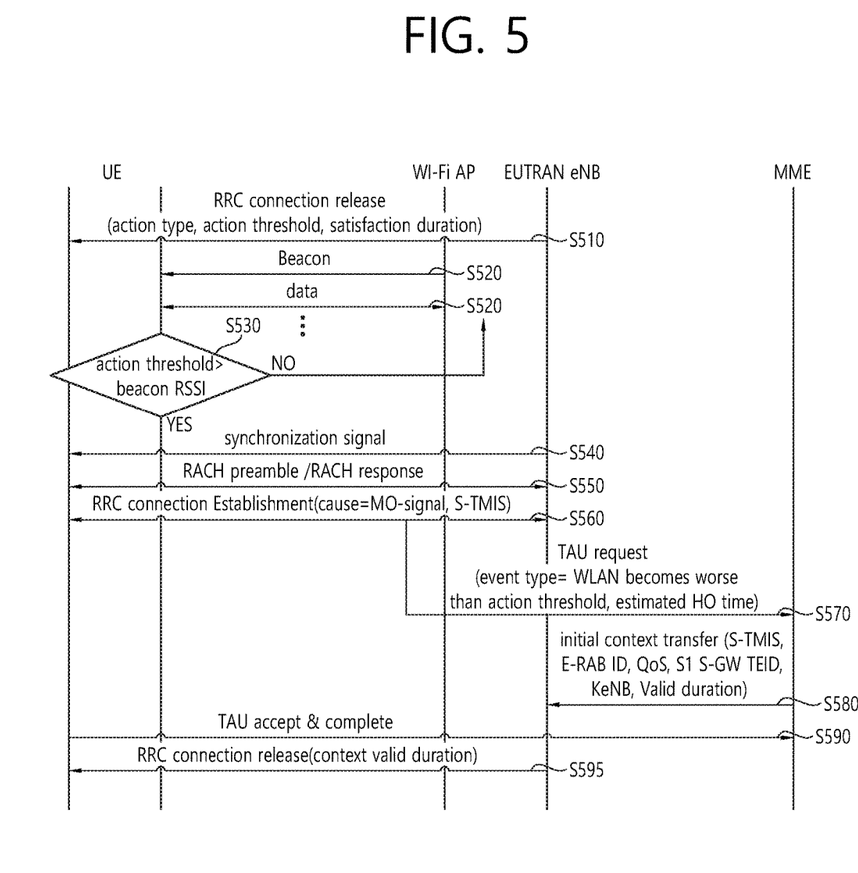
FIG. 5 is a control flowchart illustrating a reporting action of a terminal according to an exemplary embodiment of the present invention.

FIG. 5 is a control flowchart illustrating a reporting action of a terminal according to an exemplary embodiment of the present invention. FIG. 5 is a diagram illustrating context pre-setup by the UE, the base station, and the MME, when signal intensity of a wireless LAN is attenuated according to the present exemplary embodiment. Thereby, a context of the UE may be set before handover.

The EUTRAN eNB may transmit environment setup information while transmitting an RRC connection release message to the UE (S510). The environment setup information may include an action type, an action threshold, and a satisfaction duration.

That is, the EUTRAN eNB may transmit condition information in which the UE performs a reporting action of a wireless LAN state to the UE.

A cellular network between the UE and the EUTRAN eNB is not in a connection state because of RRC connection release, and the UE transmits and receives beacon and data through communication with a WI-Fi AP (S520).

While performing such communication, the UE may continue to monitor whether a beacon RSSI is smaller than an action threshold. That a beacon RSSI is smaller than an action threshold means that intensity of a signal through a wireless LAN is attenuated, and the UE may determine to report a corresponding event to the cellular network.

If a beacon RSSI is smaller than an action threshold (S530), the UE receives a synchronization signal from the EUTRAN eNB (S540) and attempts random access while transmitting and receiving a random access channel (RACH) preamble and an RACH response to and from the EUTRAN eNB (S550).

When random access is accomplished, the UE may request Radio Resource Control (RRC) connection to the EUTRAN eNB, and the EUTRAN eNB receives an RRC connection setup in response thereto and thus RRC connection between the UE and the EUTRAN eNB may be established (S560).

Such an RRC connection message may include a cause of an MO-signal.

When RRC connection is established, the UE transmits a TAU request message, which is an NAS message to an MME through the EUTRAN eNB (S570).

Such a TAU request message may include information about an event type (event type=WLAN becomes worse than action threshold) and information about event reporting of the UE such as an estimated HO time and a context pre-setup request indicator.

That is, when a request by a reporting action is received from the UE, the EUTRAN eNB establishes wireless connection to the UE and provides a message according to the reporting action, i.e., information about event reporting to a network controller, i.e., the MME of the core network.

The message according to such a reporting action may be provided to the MME according to a Tracking Area (TA) update procedure.

The MME, having received the reporting message of the UE may store an EUTRAN eNB, i.e., a cell ID that can identify a cell, for example an evolved global cell ID (EGCI) to which the UE accesses for location registration and acquire information (e.g., Access point name configuration, bearer level QoS parameter) of data stored within the MME or data in which the UE transmits and receives to and from an Wi-Fi AP through a HSS or a P-GW.

The MME, having received the TAU request message representing wireless LAN signal intensity attenuation event occurrence recognizes that at least one data flow in which the UE transmits and receives through a wireless LAN may be hand over.

Therefore, the MME transmits an initial context setup for initial context setup of the UE to the EUTRAN eNB to which the UE accesses for location registration (S580). Context information about the UE is divided into a common context and a data context corresponding to each data flow to perform handover. The common context may include an UE identifier, a KeNB, which is Security Key information, and a valid duration of a corresponding context, and the data context may include a UE Aggregate Maximum Bit Rate, an E-RAB ID, a QoS parameter, an S-GW address, and an S1 S-GW TEID. In this case, the UE identifier may use a Globally Unique Temporary Identifier (GUTI), a MME Temporary Mobile Subscriber Identity (M-TMSI), and a SAE Temporary Mobile Subscriber Identity (S-TMSI) (GUTI=PLMN ID+MMEGI+MMEC+M-TMSI, S-TMSI=MMEC+M-TMSI).

That is, the EUTRAN eNB may receive context information of the UE for setting security and data bearer from the network controller.

When an estimated handover time is not included in information about reporting of the UE, the MME may randomly determine a valid duration field value. In this case, when a EUTRAN eNB to which the UE was immediately previously accessed corresponds with a currently accessing EUTRAN eNB, a valid duration value may be set to a value larger by n-times than a previous value.

When an estimated handover time is included in information about reporting of the UE, the MME may determine a valid duration field value to a value in which predetermined β (β≥0) is added to an estimated handover time.

The MME may newly start a timer for a valid duration with a preset valid duration value. That is, a timer for a valid duration is restarted.

After context information about the UE is transmitted to the EUTRAN eNB, before a valid duration is terminated, when a change occurs in information about the UE, the MME may again transmit changed information of the UE to the EUTRAN eNB. In this case, a valid duration field may not be included in the changed information. That is, information about a valid duration may not be updated and a timer for the valid duration may not be reset.

In this case, the EUTRAN eNB may store context information about the UE for a valid duration transmitted from the MME. The EUTRAN eNB may newly start the timer for a valid duration with a corresponding valid duration value.

Further, the MME, having received the TAU message transmits a TAU Accept, which is a response thereto to the UE and thus TA update is complete between the UE and the MME (S590). In this case, a context valid duration may be included in a TAU Accept message.

The UE may recognize that a context thereof is valid in the currently accessed EUTRAN eNB for a context valid duration and newly start the timer with a context valid duration value.

In this way, when a reporting action by the UE is performed, the UE and the EUTRAN eNB release RRC connection (S595). In this case, the context valid duration may be included in an RRC connection release message.

Figure 6:
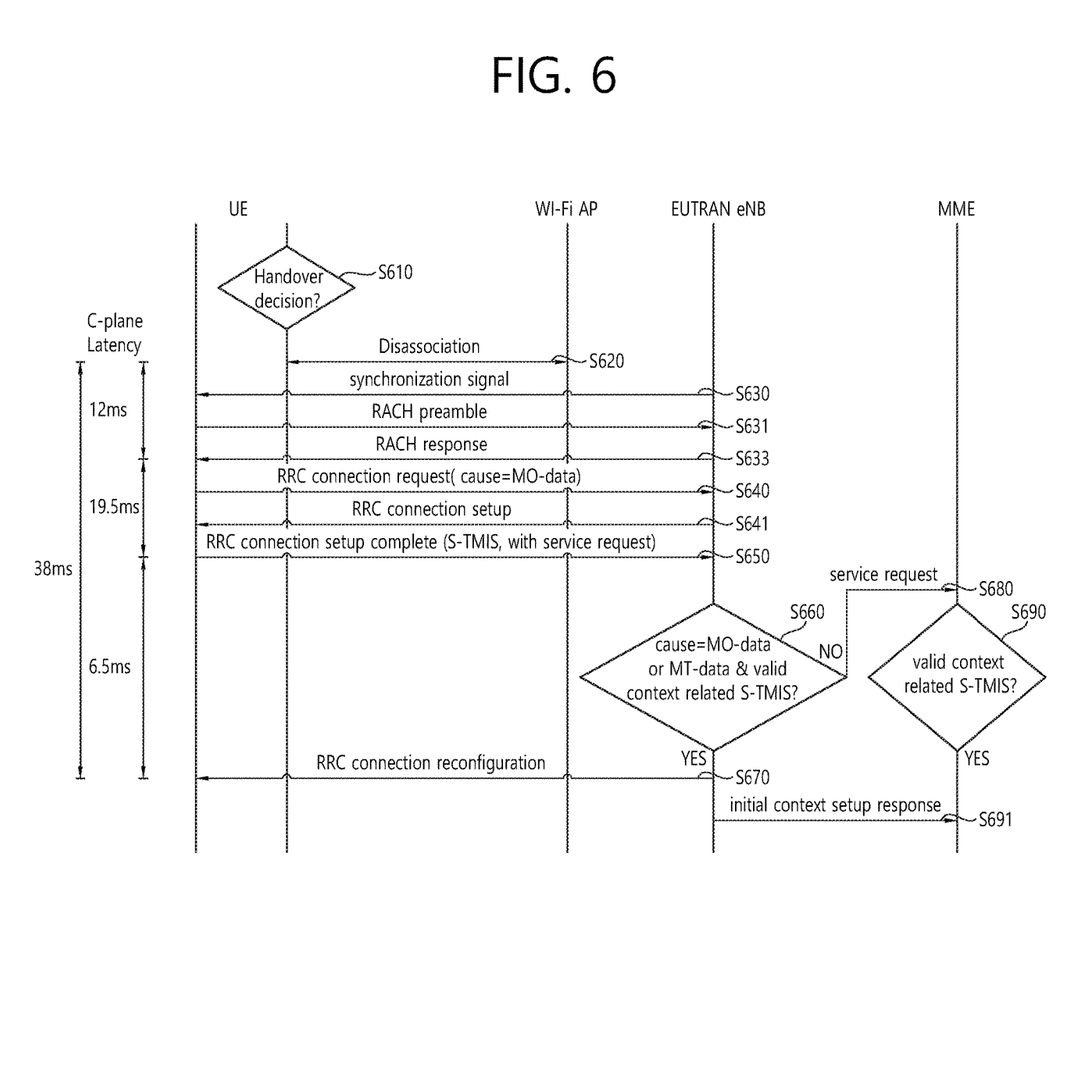
FIG. 6 is a control flowchart illustrating handover of a terminal according to an exemplary embodiment of the present invention.

FIG. 6 is a control flowchart illustrating handover of a UE according to an exemplary embodiment of the present invention. FIG. 6 illustrates a handover method when context pre-setup for shortening a handover time is performed between the UE and the MME according to a specific event occurrence condition, as shown in FIG. 5.

The UE may determine handover to another wireless communication network when intensity of a transmitted and received signal becomes weak or according to a load of a transmitted and received signal while performing wireless communication using a wireless LAN (WiFi) (S610).

When intensity of a signal is not changed and when there is no large change in a load of a transmitted and received signal, communication can be continued through the wireless LAN and thus when it is determined that the UE does not perform handover, communication may be maintained between the UE and a WiFi AP.

When handover is determined, connection between the UE and the WiFi AP is disassociated (S620), the UE attempts connection to a base station, for example a EUTRAN eNB for connecting to a heterogeneous communication network.

When the UE receives a synchronization signal from the EUTRAN eNB and is synchronized with the EUTRAN eNB (S620), and the UE transmits a random access channel (RACH) preamble to the EUTRAN eNB (S631), and the EUTRAN eNB transmits a RACH response to the UE (S633).

When random access is established, the UE requests Radio Resource Control (RRC) connection to the EUTRAN eNB (S640), and the EUTRAN eNB transmits an RRC connection setup to the UE in response thereto (S641).

In an RRC connection request message, MO-data may be included as a request cause.

The UE, having determined handover may determine whether a context thereof is valid within the EUTRAN eNB to access. If a context thereof is valid, the UE should transmit an RRC connection setup complete message including an identifier (e.g., S-TMSI) thereof to the EUTRAN eNB. A service request message may be included in the RRC connection setup complete message to be transmitted to the EUTRAN eNB (S650).

Thereby, wireless network connection is established between the UE and the EUTRAN eNB, and the UE and the EUTRAN eNB maintain an RRC connection state.

As shown in FIG. 6, about 12 ms is consumed in transmission and reception of an RACH signal, and about 19.5 ms is consumed in wireless connection between the UE and the EUTRAN eNB.

The EUTRAN eNB, having received the RRC connection setup complete message determines whether the UE, having requested access has a valid context (valid context related S-TMIS) and whether an access request reason of the UE is data transmission and reception (cause=MO-data or MT-data) (S660).

That is, when a request for data transmission and reception according to handover is received from the UE, the EUTRAN eNB may determine whether context information of the UE is valid.

If the UE has a valid context and if an access request reason of the UE is data transmission and reception, the EUTRAN eNB may set an RRC connection reconfiguration, which is security setup and data bearer setup of data flow to perform handover using the holding context without reception of a message to an initial context setup request from the MME (S670).

If the UE does not have a valid context and if an access request reason of the UE is not data transmission and reception, the EUTRAN eNB, having received a service request from the UE transmits a message of the service request to the MME (S680) and awaits a message to the initial context setup request from the MME.

The MME determines whether the EUTRAN eNB, having transmitted the service request of the UE has a valid context of the UE (valid context related S-TMIS) (S690).

If the EUTRAN eNB has a valid context of the UE, the MME may not transmit an initial context setup request message but await an initial context setup response message.

When RRC connection setup with the UE is complete and when data bearer setup based on context information is complete, the EUTRAN eNB transmits an initial context setup response message to the initial context setup request message to the MME (S691).

That is, when a request for data transmission and reception according to handover is received from the UE, the EUTRAN eNB sets data bearer of each data flow to perform handover using preset context information.

After RRC connection, about 6.5 ms is consumed for setup of data bearer, and this has a delay time shortening effect of 31 ms or more, compared with 38 ms of FIG. 3. Before handover occurs, because information about a context of the UE is previously stored at the EUTRAN eNB, it is unnecessary that the MME receives a context setup request message. Therefore, delay time shortening of FIG. 6 can be performed.

Figure 7:
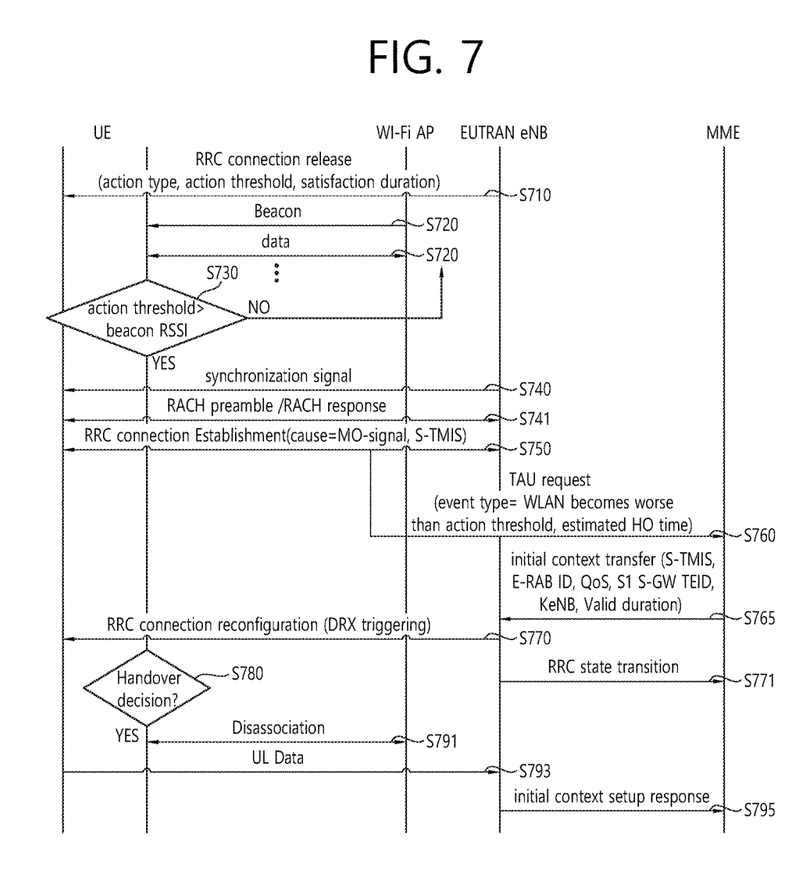
FIG. 7 is a control flowchart illustrating handover of a terminal according to another exemplary embodiment of the present invention.

FIG. 7 is a control flowchart illustrating wireless LAN report and handover of a UE according to another exemplary embodiment of the present invention.

When the EUTRAN eNB transmits an RRC connection release message to the UE, the EUTRAN eNB may transmit environment setup information to the UE (S710). The environment setup information may include an action type, an action threshold, and a satisfaction duration.

A cellular network between the UE and the EUTRAN eNB is not in a connection state because of RRC connection release, and the UE transmits and receives beacon and data through communication with a WI-Fi AP (S720).

The UE may continue to monitor whether a beacon RSSI is smaller than an action threshold and thus the UE may determine to report a corresponding event to a cellular network.

If a beacon RSSI is smaller than an action threshold (S730), the UE receives a synchronization signal from the EUTRAN eNB (S740) and attempts random access while transmitting and receiving a random access channel (RACH) preamble and an RACH response to and from the EUTRAN eNB (S741).

If a beacon RSSI is larger than an action threshold, the UE and the WI-Fi AP maintain an existing communication state.

When random access is established, the UE may request Radio Resource Control (RRC) connection to the EUTRAN eNB, and the EUTRAN eNB receives an RRC connection setup in response thereto and thus RRC connection between the UE and the EUTRAN eNB may be established (S750).

Such an RRC connection message may include a cause of an MO-signal.

When RRC connection is established, the UE transmits a TAU request message, which is a NAS message to the MME through the EUTRAN eNB (S760).

Such a TAU request message may include information about an event type (event type=WLAN becomes worse than action threshold) and information about event reporting of the UE such as an estimated HO time and a context pre-setup request indicator.

The MME, having received a reporting message of the UE may store an EUTRAN eNB, i.e., a cell ID that can identify a cell, for example an evolved global cell ID (EGCI) to which the UE accesses for location registration and acquire information (e.g., Access point name configuration, bearer level QoS parameter) of data stored within the MME or data in which the UE transmits and receives to and from an Wi-Fi AP through a HSS or a P-GW.

The MME, having received a TAU request message representing wireless LAN signal intensity attenuation event occurrence recognizes that at least one data flow in which the UE transmits and receives through a wireless LAN may be hand over.

Therefore, the MME transmits an initial context setup message for initial context setup of the UE to the EUTRAN eNB to which the UE accesses for location registration (S765).

Context information about the UE may include an UE identifier, a UE Aggregate Maximum Bit Rate, an E-RAB ID, a QoS parameter, an S-GW address, an S1 S-GW TEID, a KeNB, which is Security Key information, and a valid duration of a corresponding context.

When an estimated handover time is not included in information about reporting of the UE, the MME may randomly determine a valid duration field value. In this case, when the EUTRAN eNB to which the UE was immediately previously accessed corresponds with a currently accessing EUTRAN eNB, a valid duration value may be set to a value larger by n-times than a previous value.

When information about reporting of the UE includes an estimated handover time, the MME may determine a valid duration field value to a value in which predetermined β (β≥0) is added to an estimated handover time.

The MME may newly start a timer for a valid duration with a preset valid duration value. That is, a timer for a valid duration is restarted.

After context information about the UE is transmitted to the EUTRAN eNB, before a valid duration is terminated, when a change occurs in information about the UE, the MME may transmit again changed information of the UE to the EUTRAN eNB. In this case, a valid duration field may not be included in the changed information. That is, information about a valid duration may not be updated and a timer for a valid duration may not be reset.

In this case, the EUTRAN eNB may store context information about the UE for a valid duration transmitted from the MME. The EUTRAN eNB may newly start the timer for a valid duration with a corresponding valid duration value.

The EUTRAN eNB may set security setup using the received context of the UE and an RRC connection reconfiguration, which is data bearer setup of data flow to perform handover (S770).

The RRC connection environment setup message may include Discontinuous Reception (DRX) triggering information, and the UE may operate in a sleep mode according to a DRX parameter value. In an existing DRX mode, after short/long DRX is performed, when a specific time has elapsed, a status of the UE may be changed to an idle status, but the base station may set a DRX parameter such that a status of the UE is not changed to an idle status. Further, in order to minimize power consumption of the UE, it may be set that the UE operates in long DRX without short DRX. The EUTRAN eNB may notify the MME that a status of the UE is changed to an RRC connection status (RRC state transition) (S771).

Thereafter, when the UE determines handover (S780), connection between the UE and the WiFi AP is disassociated (S791), and the UE may transmit UL data to the EUTRAN eNB (S793).

The MME, having recognized that a status of the UE was changed to a RRC connection status may stop the timer for a valid duration and await an initial context setup response to an initial context setup request message from the EUTRAN eNB.

Because the EUTRAN eNB has a valid context of the UE, similar to a case of FIG. 6, the EUTRAN eNB transmits an initial context setup response message to the initial context setup request message to the MME (S795).

According to the present exemplary embodiment, upon performing handover, because a delay time consumed in a control plane is 0 ms, 26 ms consumed in a user plane becomes a total delay time of handover.

The EUTRAN eNB may determine whether to perform handover of FIG. 6 or to perform handover of FIG. 7 according to a context of the UE received from the MME, for example, a QoS parameter (e.g., QoS Class Identifier) or a valid duration.

For example, when a short delay time is required, as in a case in which packet delay is 60 ms or less or a case in which a valid duration is is or less, a delay time of a control plane can be largely shortened according to an exemplary embodiment described with reference to FIG. 7.

Figure 8:
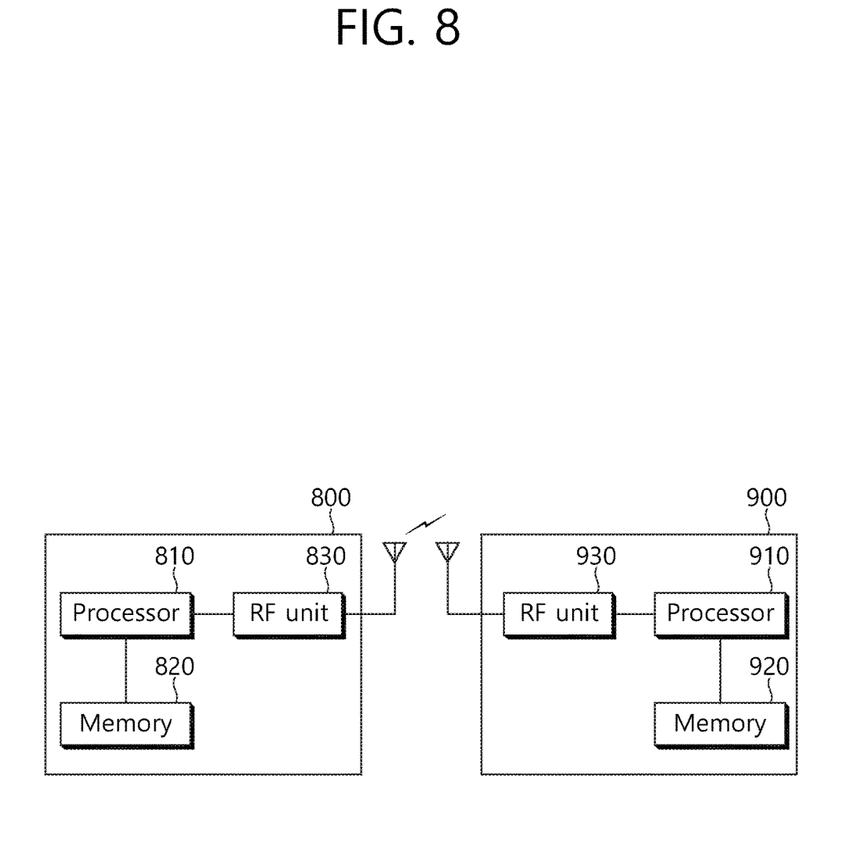
FIG. 8 is a block diagram illustrating a configuration of a wireless communication system according to an exemplary embodiment of the present invention.

FIG. 8 is a block diagram illustrating a configuration of a wireless communication system according to an exemplary embodiment of the present invention.

A base station 800 includes a processor 810, a memory 820, and a radio frequency (RF) unit 830. The processor 810 implements a suggested function, process, and/or method. Layers of a wireless interface protocol may be implemented by the processor 810. The memory 820 is connected to the processor 810 to store various information for driving the processor 810. The RF unit 830 is connected to the processor 810 to transmit and/or receive a wireless signal. The base station 800 of FIG. 8 may include the foregoing cellular base station or EUTRAN eNB.

A terminal 900 includes a processor 910, a memory 920, and an RF unit 930. The processor 910 implements a suggested function, process, and/or method. Layers of a wireless interface protocol may be implemented by the processor 910. The memory 920 is connected to the processor 910 to store various information for driving the processor 910. The RF unit 930 is connected to the processor 910 to transmit and/or receive a wireless signal. The terminal 900 of FIG. 8 may include the foregoing multi RAT UE.

The processor may include an application-specific integrated circuit (ASIC), another chipset, a logic circuit and/or a data processor. The memory may include a read-only memory (ROM), a random access memory (RAM), a flash memory, a memory card, a storage medium, and/or another storage device. The RF unit may include a baseband circuit for processing a wireless signal. When an exemplary embodiment is implemented with software, the above-described technique may be implemented with a module (process, function) that performs the above-described function. The module may be stored at a memory and may be executed by the processor. The memory may exist at the inside or the outside of the processor and may be connected to the processor with a well-known various means.

In the above exemplary systems, although the methods have been described on the basis of the flowcharts using a series of steps or blocks, the present invention is not limited to the sequence of the steps, and some of the steps may be performed with different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A handover method performed by an eNodeB (eNB), the method comprising:
    transmitting condition information to a terminal performing a predetermined reporting action when currently performing wireless communication with a wireless access device;
    establishing a radio resource control (RRC) connection to the terminal when a request by the reporting action is received from the terminal and providing a message according to the reporting action to a network controller of a core network;
    determining whether predetermined context information of the terminal previously stored by the eNB before the handover is performed is valid when a request for data transmission and reception according to the handover is received from the terminal;
    setting a data bearer of each of a plurality of data flows to perform the handover using the predetermined context information when the predetermined context information is determined as valid without receiving an initial context setup request message from the network controller; and
    receiving data transmitted by the terminal.

2. The method of claim 1, wherein:
    the predetermined reporting action comprises reporting a change of the wireless communication of the terminal; and
    the condition information comprises an action threshold for comparison with both signal intensity according to the currently performed wireless communication and a duration of time during which the signal intensity should be maintained below the action threshold.

3. The method of claim 1, wherein the condition information is transmitted via an RRC message.

4. The method of claim 1, wherein the message according to the reporting action comprises:
    event information related to reporting; and
    information related to a time point during which an event has occurred and an estimated time during which handover is estimated to occur.

5. The method of claim 1, further comprising releasing wireless connection with the terminal when the predetermined context information is received.

6. An eNodeB (eNB) for performing handover, the eNB comprising:
    a transceiver configured to transmit and receive signals; and
    a processor connected to the transceiver and configured to:
    control the transceiver to transmit condition information to a terminal performing a predetermined reporting action when currently performing wireless communication with a wireless access device;
    establish a radio resource control (RRC) connection to the terminal when a request by the reporting action is received from the terminal and control the transceiver to provide a message according to the reporting action to a network controller of a core network;
    determine whether predetermined context information of the terminal previously stored by the eNB before the handover is performed is valid when a request for data transmission and reception according to the handover is received from the terminal;
    set a data bearer of each of a plurality of data flows to perform the handover using the predetermined context information when the predetermined context information is determined as valid without receiving an initial context setup request message from the network controller; and
    control the transceiver to receive data transmitted by the terminal.

7. The eNB of claim 6, wherein:
    the predetermined reporting action comprises reporting a change of the wireless communication of the terminal; and
    the condition information comprises an action threshold for comparison with both signal intensity according to the currently performed wireless communication and a duration of time during which the signal intensity should be maintained below the action threshold.

8. The eNB of claim 6, wherein the condition information is transmitted via an RRC message.

9. The eNB of claim 6, wherein the message according to the reporting action comprises:
  event information related to reporting; and
  information related to a time point during which an event has occurred and an estimated time during which handover is estimated to occur.

10. The eNB of claim 6, wherein the processor is further configured to release wireless connection with the terminal when the predetermined context information is received.

* * * * *